United States Patent
Choi et al.

(10) Patent No.: US 9,969,243 B2
(45) Date of Patent: May 15, 2018

(54) DUAL TYPE AIR CONDITIONING CONTROL SYSTEM OF VEHICLE

(71) Applicants: HYUNDAI MOTOR COMPANY, Seoul (KR); KIA MOTORS CORPORATION, Seoul (KR); HALLA VISTEON CLIMATE CONTROL CORP., Daejeon (KR)

(72) Inventors: Jae Sik Choi, Suwon-si (KR); Byoung Hyun Ji, Goyang-si (KR); Su Yeon Kang, Seoul (KR); Young Bae Jeon, Daejeon (KR); Jun Ho Choi, Daejeon (KR)

(73) Assignees: Hyundai Motor Company, Seoul (KR); Kia Motors Corporation, Seoul (KR); Halla Visteon Climate Control Corp., Daejeon (KR)

( * ) Notice: Subject to any disclaimer, the term of this patent is extended or adjusted under 35 U.S.C. 154(b) by 251 days.

(21) Appl. No.: 14/863,424

(22) Filed: Sep. 23, 2015

(65) Prior Publication Data
US 2016/0129752 A1 May 12, 2016

(30) Foreign Application Priority Data
Nov. 7, 2014 (KR) .................. 10-2014-0154299

(51) Int. Cl.
*B60H 1/00* (2006.01)
(52) U.S. Cl.
CPC ..... *B60H 1/00742* (2013.01); *B60H 1/00971* (2013.01)
(58) Field of Classification Search
CPC ..................................................... B60H 1/21
(Continued)

(56) References Cited

U.S. PATENT DOCUMENTS 4,537,245 A * 8/1985 Nishimura ......... B60H 1/00842
165/203
4,696,167 A * 9/1987 Matsui ............... B60H 1/00735
62/180
(Continued)

FOREIGN PATENT DOCUMENTS

JP 10-119542 A 5/1998
JP 2001-105839 A 4/2001
(Continued)

OTHER PUBLICATIONS

Pushing-pulling based vehicle parking ventilation cooling characteristics analysis; Zhi Li; Haobo Xu; Gangfeng Tan; Zizhen Yu; Zhongjie Yang; Zhilei Li; Yuandong Liu; Jing Cai; 2015 IEEE International Transportation Electrification Conference (ITEC) Year: 2015; pp. 1-6, DOI: 10.1109/ITEC-India.2015.7386873.*

(Continued)

*Primary Examiner* — Cuong H Nguyen
(74) *Attorney, Agent, or Firm* — McDermott Will & Emery LLP

(57) ABSTRACT

A dual type air conditioning control system of a vehicle has a front-seat air conditioner for air-conditioning of a front-seat space and a rear-seat air conditioner for air-conditioning of a rear-seat space of the vehicle. The system includes a front-seat controller configured to control an operation and an output of the front-seat air conditioner, and to calculate a control target value for controlling an output of the rear-seat conditioner. The rear-seat controller is configured to receive the calculated control target value transmitted from the front-seat controller and to control the output of the rear-seat air conditioner based on the transmitted control target value.

7 Claims, 2 Drawing Sheets

(58) Field of Classification Search
USPC ............... 701/36; 62/186, 244; 340/5.31; 165/203, 42, 47, 48.1, 58; 703/36
See application file for complete search history.

(56) References Cited

U.S. PATENT DOCUMENTS

| | | | | |
|---|---|---|---|---|
| 6,012,297 | A * | 1/2000 | Ichishi | B60H 1/00871 165/203 |
| 6,301,909 | B1 * | 10/2001 | Hayasaka | B60H 1/00007 62/175 |
| 2004/0060311 | A1 * | 4/2004 | Imoto | B60H 1/00007 62/231 |
| 2008/0186282 | A1 * | 8/2008 | Nix | B60K 37/00 345/173 |
| 2014/0034266 | A1 * | 2/2014 | Tabei | B60H 1/00764 165/42 |
| 2014/0373563 | A1 * | 12/2014 | Mizutani | B60H 1/00807 62/186 |

FOREIGN PATENT DOCUMENTS

| | | |
|---|---|---|
| JP | 2007-137342 A | 6/2007 |
| JP | 2008-265425 A | 11/2008 |
| KR | 10-2010-0094717 A | 8/2010 |

OTHER PUBLICATIONS

Fuzzy-timing Petri net model of temperature control for car air conditioning system; K. Watanuki; T. Murata; Systems, Man, and Cybernetics, 1999. IEEE SMC '99 Conference Proceedings. 1999 IEEE International Conference on; Year: 1999, vol. 4 pp. 618-622 vol. 4, DOI: 10.1109/ICSMC.1999.812475.*

Electric Vehicle Intelligent Control System-Hardware modules configurations; Gan Yu Han; Leong Chee Ken; Chew Kuew Wai; 2012 IEEE Conference on Sustainable Utilization and Development in Engineering and Technology (Student); year 2012, pp. 187-101.*

* cited by examiner

DUAL TYPE AIR CONDITIONING CONTROL SYSTEM OF VEHICLE

CROSS-REFERENCE TO RELATED APPLICATION

This application claims under 35 U.S.C. § 119(a) the benefit of Korean Patent Application No. 10-2014-0154299 filed on Nov. 7, 2014, the entire content of which is incorporated herein by reference.

TECHNICAL FIELD

The present disclosure relates to a dual type air conditioning control system of a vehicle. More particularly, the present disclosure relates to a dual type air conditioning control system of a vehicle which can control a rear-seat air conditioner at a front seat of the vehicle and prevent mal-operation of the rear-seat air conditioner by a rear-seat passenger.

BACKGROUND

In general, a vehicle includes an air conditioner which includes a cooling apparatus for cooling and a heating apparatus for heating a vehicle interior.

Such as air conditioner comprises a single type air conditioning system constituted by one air conditioner. However, a vehicle having a wide interior space such as a SUV or bus has a dual-type air conditioning system constituted by a front-seat air conditioner for a front side of the vehicle and a rear-seat air conditioner for a rear side of the vehicle.

The vehicle having the dual-type air conditioning system includes, in general, a button for controlling power supply of the rear-seat air conditioner and a button to change a control agent of the rear-seat air conditioner. Thus, the rear-seat air conditioner cannot be controlled at a front seat in the related art.

As a result, an operation mode of the rear-seat air conditioner may be different from an operation mode requested by a current user. For example, when a rear-seat passenger unintentionally selects a heating mode, the rear-seat passenger is required to manually change to a cooling mode since the rear-seat air conditioner cannot be controlled at the front seat.

When an operation button provided in the rear-seat controller is pressed unintentionally, a control value (an operation stage of a heating apparatus or a cooling apparatus) of the rear-seat air conditioner may be changed; however, the changed control value cannot be modified at the front seat. Accordingly, a front-seat driver may need to stop the vehicle to change the control value or the operation mode of the rear-seat air conditioner.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with a prior art and to provide a dual air conditioning control system of a vehicle, which comprises various rear operation buttons to control a rear-seat air conditioner by a front-seat controller at a front seat, and comprises further a rear lock button for locking an operation button provided in a rear-seat controller to prevent a mal-operation of the rear-seat air conditioner by a rear-seat passenger.

In an exemplary embodiment of the present inventive concept, a dual type air conditioning control system of a vehicle having a front-seat air conditioner for air-conditioning of a front-seat space and a rear-seat air conditioner for air-conditioning of a rear-seat space of the vehicle includes a front-seat controller configured to control the front-seat air conditioner and to calculate a control target value for controlling an output of the rear-seat air conditioner. A rear-seat controller is configured to receive the calculated control target value transmitted from the front-seat controller and to control the output of the rear-seat air conditioner based on the control target value.

The front-seat controller may include a rear on button for controlling power supplies of the rear-seat air conditioner and the rear-seat controller and may control turning-on and turning-off of the rear-seat air conditioner and the rear-seat controller when the rear on button is selected.

The front-seat controller may include a rear lock button for locking various buttons provided in the rear-seat controller to prevent an operation of the rear-seat controller when the rear lock button is selected.

The front-seat controller may calculate the control target value of the rear-seat air conditioner based on an input value of the rear operation button provided in the front-seat controller when rear lock button is selected.

The front-seat controller may calculate the control target value of the rear-seat air conditioner based on the input value of the rear-seat operation button transmitted by the rear-seat controller when the rear lock button is selected.

The rear-seat controller may continuously transmit the operation mode of the rear-seat air conditioner and an input value of the rear-seat operation button to the front-seat controller when rear-seat operation button is selected.

According to a dual type air conditioning control system of a vehicle of the present disclosure, an output of a rear-seat air conditioner can be controlled at a front seat and mal-operation of a rear-seat air conditioner by a rear-seat passenger can be prevented by control of a front-seat controller.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
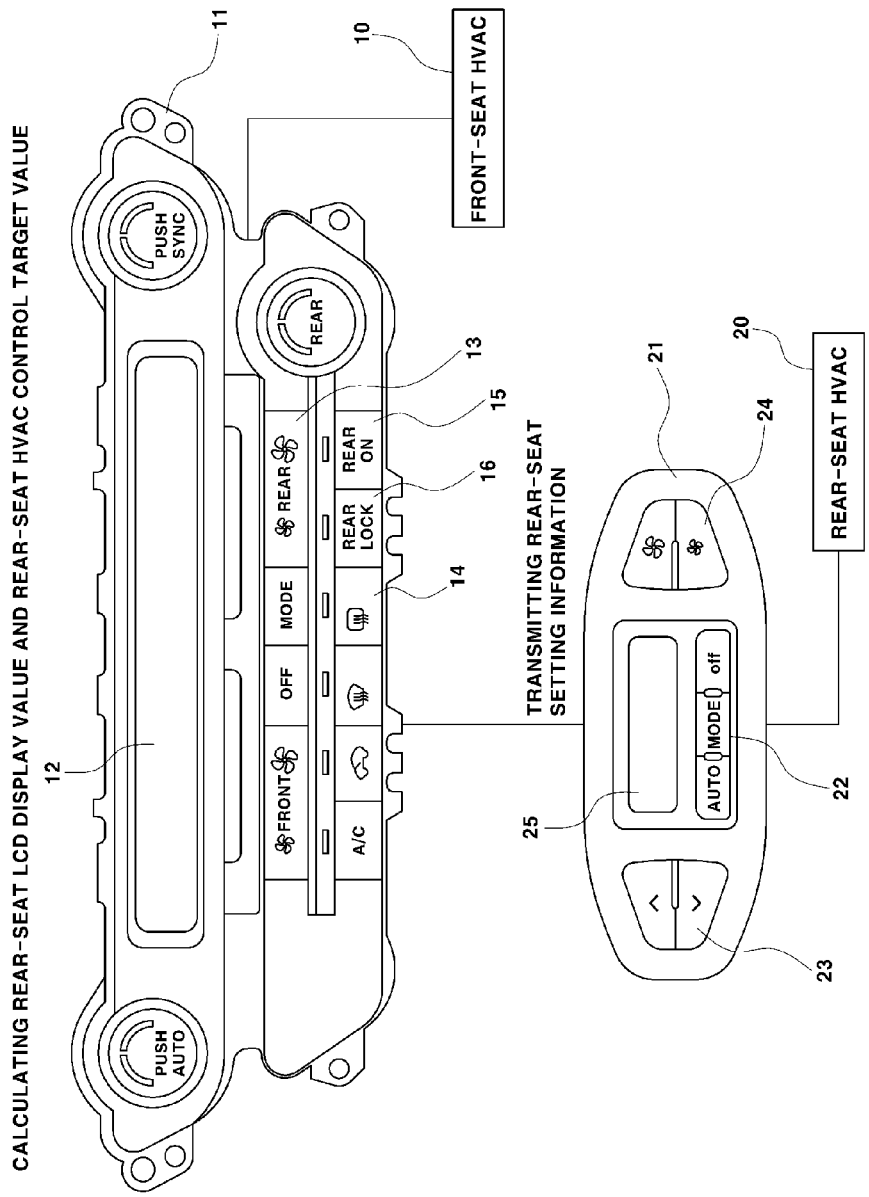
FIG. 1 is a configuration diagram illustrating a dual air conditioning control system of a vehicle according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the invention to those exemplary embodiments. On the contrary, the disclosure is intended to cover not only the exemplary embodiments, but also various alternatives, modifications, equivalents, and other embodiments, which may be included within the spirit and scope of the invention as defined by the appended claims.

Hereinafter, an exemplary embodiment of the present inventive concept will be described in detail with reference to the accompanying drawings.

As illustrated in FIG. 1, a dual type air conditioning control system of a vehicle according to the present disclosure includes a front-seat air conditioner 10 for air-conditioning of a front-seat space of the vehicle and a rear-seat air conditioner 20 for air-conditioning of a rear-seat space of the vehicle. A front-seat controller 11 and a rear-seat controller 21 control outputs of the respective air conditioners 10 and 20.

The front-seat controller 11 includes various operation buttons (front-seat operation button) for operating the front-seat air conditioner 10 to perform a function corresponding to the selected front-seat operation button. The front-seat controller 11 comprises a rear on button 15 for controlling on/off of power supplies of the rear-seat controller 21 and the rear-seat air conditioner 20 for an operation and the output of the rear-seat air conditioner 20; and various rear operation buttons 13 and 14 for controlling various outputs of the rear-seat air conditioner 20. The rear-seat controller 21 comprises a rear lock button 16 for preventing malfunction of various buttons, such as a mode change button 22 and rear-seat operation buttons 23 and 24.

Referring to FIG. 1, for example, the rear operation buttons 13 and 14 include a rear cooling operation button 13 for changing and controlling an output (an output of the rear-seat air conditioner 20 in a cooling mode state) of a rear-seat cooling mode and a rear heating operation button 14 for changing and controlling an output (an output of the rear-seat air conditioner 20 in a heating mode state) of a rear-seat heating mode.

The front-seat controller 11 operates depending on selection and operation of each button. For example, when the rear on button 15 is selected, the front-seat controller 11 outputs a signal for turning on or off the power supplies of the rear-seat controller 21 and the rear-seat air conditioner 20 and transmits the signal to the rear-seat controller 21.

When the rear cooling operation button 13 or the rear heating operation button 14 is selected, the front-seat controller 11 calculates a control target value (a value for controlling the output of the rear-seat air conditioner 20 to a target value) for controlling an output value of the rear-seat air conditioner 20 according to an input value (a value input/transmitted into the rear-seat controller 21 at the time of selecting the rear heating operation button 14) transmitted from the operated rear cooling operation button 13 or the rear heating operation button 14 and transmits the calculated control target value to the rear-seat controller 21. When the rear lock button 16 is selected, the front-seat controller 11 outputs a signal for locking the rear-seat operation buttons 23 and 24 and transmits the output signal to the rear-seat controller 21.

That is, the front-seat controller 11 generates a signal (control target value and the like) depending on selection and operation of each button associated with the rear-seat air conditioner 20 and transmits the generated signal to the rear-seat controller 21, and then, the rear-seat controller 21 operates depending on the signal received from the front-seat controller 11.

The rear-seat controller 21 includes: the rear-seat mode change button 22 for changing the operation mode of the rear-seat air conditioner 20 to the cooling mode or heating mode; the rear-seat operation buttons 23 and 24 for providing an input value (an output control value for controlling the output of the rear-seat air conditioner 20) for controlling the output value of the rear-seat air conditioner 20 to be set as the cooling mode or the heating mode to the rear-seat controller 21; and a rear-seat display 25 for displaying state information of the rear-seat air conditioner 20.

Since the operation of the rear-seat operation buttons 23 and 24 is locked when the rear lock button 16 is selected, the rear-seat controller 21 does not control the operation and the output of the rear-seat air conditioner 20 even when a rear-seat passenger selects the predetermined rear-seat operation buttons 23 and 24. Thus, it is possible to prevent malfunction of the rear-seat air conditioner 20 by a maloperation of the rear-seat operation buttons 23 and 24 of the rear-seat passenger.

When the rear operation buttons 13 and 14 are selected from a front seat, the function of the rear lock button 16 is performed similarly to the case of operating the rear lock button 16, and as a result, it is impossible to control the output of the rear-seat air conditioner 20 using the rear-seat operation buttons 23 and 24.

That is, although the operation buttons 23 and 24 of the rear-seat controller 21 are selected while the rear operation buttons 13 and 14 of the front-seat controller 11 are selected, it is impossible to change the output of the rear-seat air conditioner 20.

The front-seat controller 11 calculates the control target value of the rear-seat air conditioner 20 based on input values (values input/transmitted into the rear-seat controller at the time of pressing the rear operation buttons) of the rear operation buttons 13 and 14 provided in the front-seat controller 11 when the rear lock button 16 operates in an on state or the rear operation buttons 13 and 14 are selected.

The front-seat controller 11 calculates the control target value of the rear-seat air conditioner 20 based on input values (values input/transmitted into the rear-seat controller at the time of pushing and selecting the rear-seat operation buttons) of the rear-seat operation buttons 23 and 24 provided in the rear-seat controller 21 when the rear lock button 16 operates in an off state or the rear-seat operation buttons 23 and 24 are selected and the rear operation buttons 13 and 14 are not selected.

In this case, the rear-seat controller 21 continuously transmits the operation mode of the rear-seat air conditioner 20 and the input values of the rear-seat operation buttons 23 and 24 to the front-seat controller 11 regardless of turn-on/off of the rear lock button 16.

The front-seat controller 11 includes a front-seat display 12 for displaying state information of the front-seat air conditioner 10 and the rear-seat air conditioner 20 in addition to various buttons.

Figure 2:
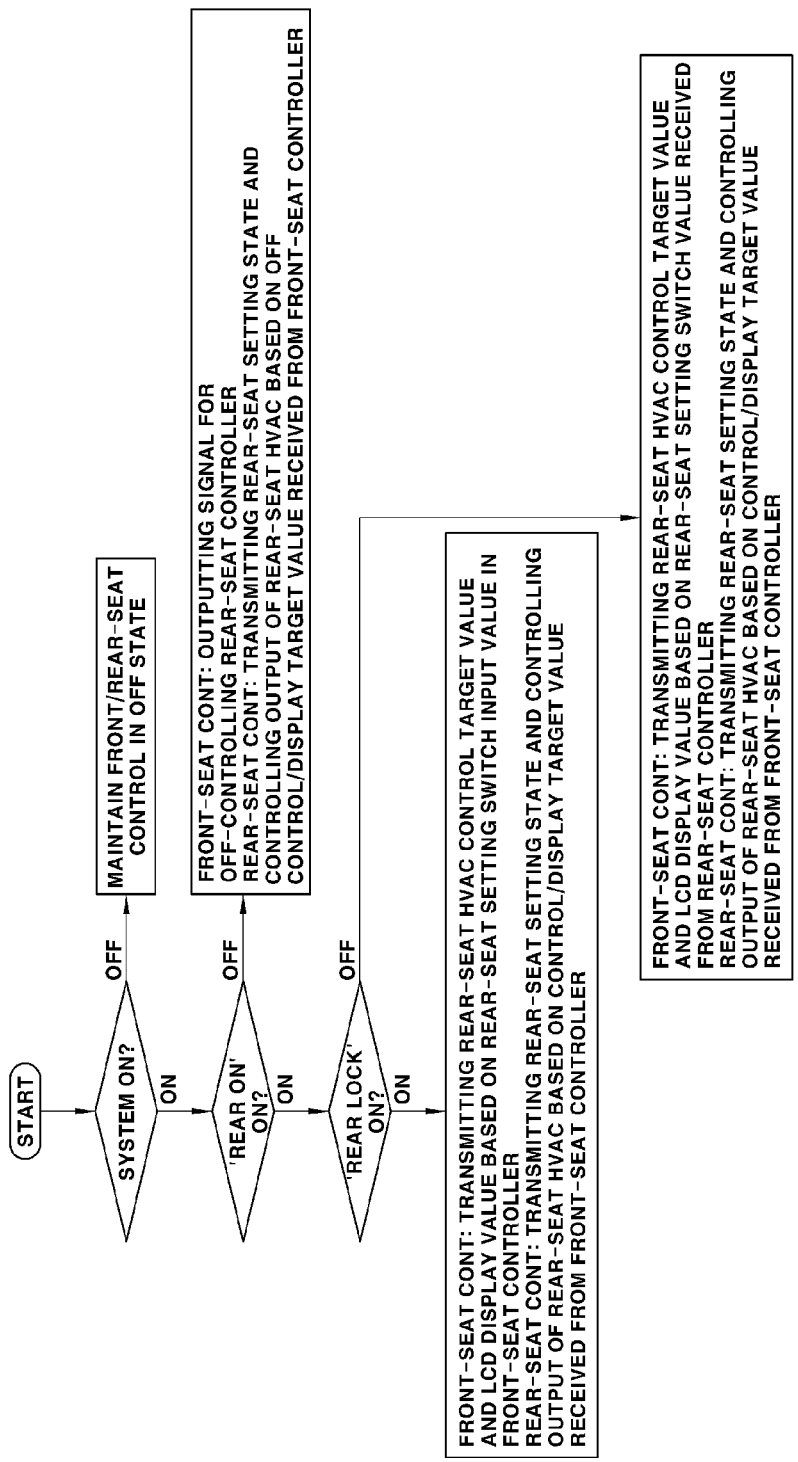
FIG. 2 is a schematic view illustrating a method for controlling a dual air conditioning control system of a vehicle according to the present disclosure.

FIG. 2 is a schematic view illustrating a method for controlling a dual air conditioning control system of a vehicle according to the present disclosure.

Referring to FIG. 2, when the system turns on the front-seat controller 11 and the rear on button 15 of the front-seat controller 11 is selected to supply power to the rear-seat controller 21 and the rear-seat air conditioner 20, the rear-seat controller 21 transmits setting information (the operation mode of the rear-seat air conditioner and the input value of the rear-seat operation button) to the front-seat controller 11.

In this case, the rear-seat controller 21 converts signals (input values) of the rear-seat operation buttons 23 and 24 selected by a user into communication values and transmits the communication values to the front-seat controller 11. Then, the front-seat controller 11 calculates the control target value for controlling the output of the rear-seat air conditioner 20 and display information (information on the output value of the rear-seat air conditioner shown to the user) displayed in the rear-seat display 25 by collecting the received signals (input values) of the rear-seat controller 21 and the on/off information of the rear lock button 16, and thereafter, transmits the calculated control target value and display information to the rear-seat controller 21.

The control target value is a reference value used for the rear-seat controller 21 to control the output of the rear-seat air conditioner 20, and a calculation result varies depending on the operation of the rear lock button 16 as described above. When the rear lock button 16 is in the on state, the control target value is calculated based on the input values of the rear operation buttons 13 and 14 provided in the front-seat controller 11. When the rear lock button 16 is in the off state, the control target value is calculated based on the input values of the rear-seat operation buttons 23 and 24 provided in the rear-seat controller 21.

The rear-seat controller 21 outputs and displays the display information received by the front-seat controller 11 onto the rear-seat display 25 (a display unit of the rear-seat controller) while controlling the operation and the output of the rear-seat air conditioner 20 according to the control target value transmitted by the front-seat controller 11.

The rear-seat display 25 is operated by receiving the power simultaneously when the rear on button 15 is pressed to operate the rear-seat controller 21.

When the rear on button 15 provided in the front-seat controller 11 is turned off, the front-seat controller 11 outputs and transmits a signal for off-controlling the rear-seat controller 21 and the rear-seat air conditioner 20 to the rear-seat controller 21.

In this case, the rear-seat controller 21 transmits the setting information (the operation mode of the rear-seat air conditioner and the input value of the rear-seat operation button) of the rear-seat air conditioner 20 to the front-seat controller 11 until being turned off by receiving an off control signal of the front-seat controller 11 and controls the output of the rear-seat air conditioner 20 and the output of the rear-seat display 25 based on the off control signal and the display information received from the front-seat controller 11.

The invention has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A dual type air conditioning control system of a vehicle having a front-seat air conditioner for air-conditioning of a front-seat space and a rear-seat air conditioner for air-conditioning of a rear-seat space of the vehicle, the system comprising:
a front-seat controller configured to control an operation and an output of the front-seat air conditioner, and to calculate a control target value for controlling an output of the rear-seat air conditioner; and
a rear-seat controller configured to receive the calculated control target value transmitted from the front-seat controller and to control the output of the rear-seat air conditioner based on the transmitted control target value,
wherein the front-seat controller includes a rear lock button for locking various buttons provided in the rear-seat controller to prevent an operation of the rear-seat controller and calculates the control target value of the rear-seat air conditioner based on an input value of a rear operation button provided in the front-seat controller when the rear lock button is selected.

2. The system of claim 1, wherein the front-seat controller includes a rear on button for controlling power supplies of the rear-seat air conditioner and the rear-seat controller and controls turning-on and turning-off of the rear-seat air conditioner and the rear-seat controller when the rear on button is selected by a user.

3. The system of claim 1, wherein the front-seat controller includes a rear lock button for locking various buttons provided in the rear-seat controller to prevent an operation of the rear-seat controller when the rear lock button is selected.

4. The system of claim 1, wherein the rear operation button includes a rear cooling operation button for selecting a rear-seat cooling mode and a rear heating operation button for selecting an output of a rear-seat heating mode.

5. The system of claim 1, wherein the front-seat controller includes a rear lock button for locking various buttons provided in the rear-seat controller and calculates the control target value of the rear-seat air conditioner based on an input value of a rear-seat operation button transmitted by the rear-seat controller when the rear lock button is unselected.

6. The system of claim 1, wherein the rear-seat controller continuously transmits an operation mode of the rear-seat air conditioner and an input value of a rear-seat operation button to the front-seat controller when the rear-seat operation button is selected.

7. The system of claim 5, wherein the rear-seat operation button provides the input value for controlling an output value of the rear-seat air conditioner to set as a cooling mode or a heating mode to the rear-seat controller.

* * * * *